I. J. RICHARDSON.
Straw Cutter.
No. 4,384.
Patented Feb. 10, 1846.
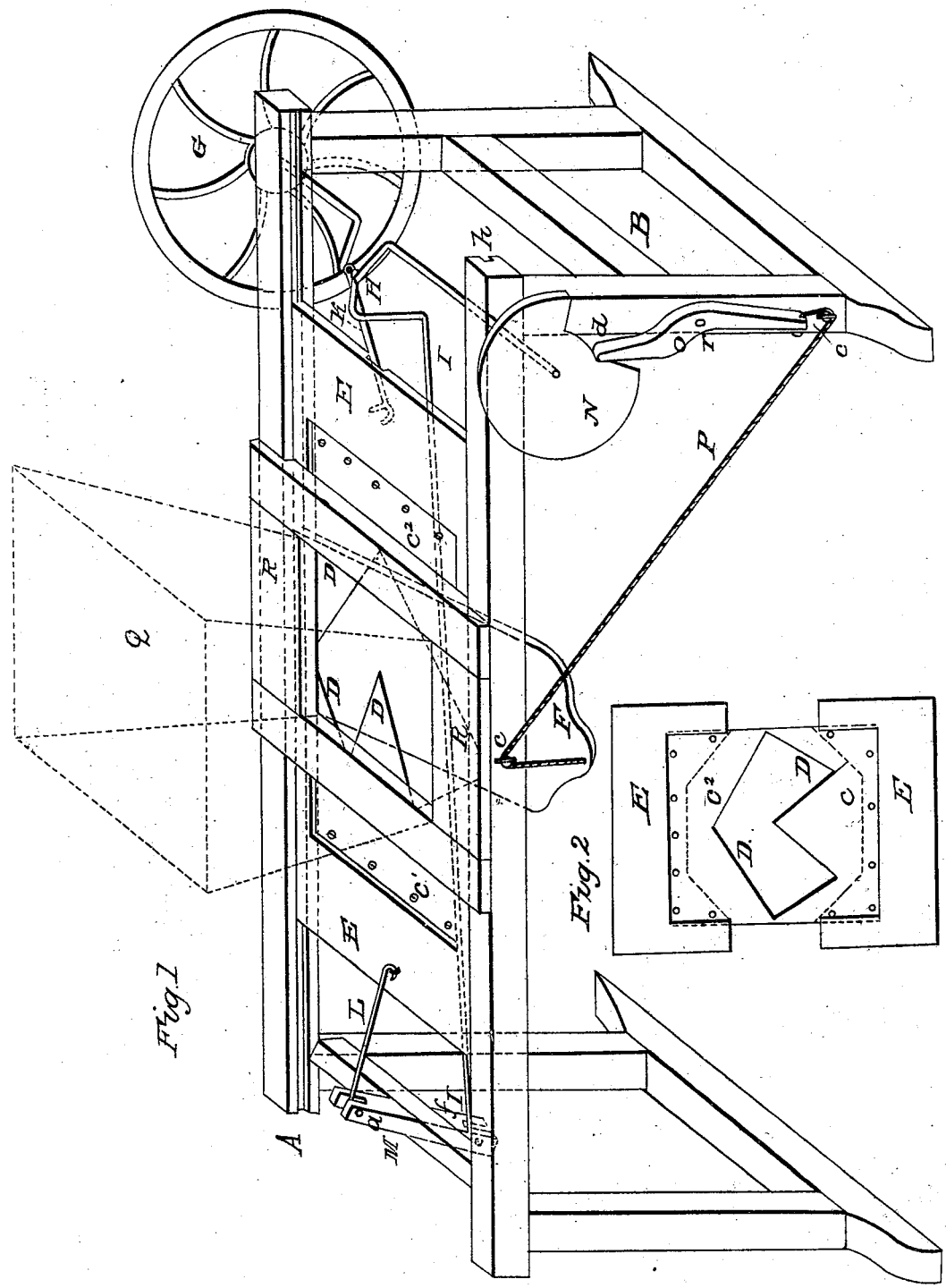

UNITED STATES PATENT OFFICE.

ISRAEL J. RICHARDSON, OF NEW YORK, N. Y.

STRAW-CUTTER.

Specification of Letters Patent No. 4,384, dated February 10, 1846.

*To all whom it may concern:*

Be it known that I, ISRAEL J. RICHARDSON, of the city of New York, in the State of New York, have invented a new and useful Improvement in Machines for Cutting Straw, of which the following is a full and exact description, reference being had to the annexed drawings, forming a part of this specification.

This improvement consists: First—In the use of two knives, with edges of saw teeth form, acting together and cutting the straw between them as they approach and overlap each other from opposite directions, by a simultaneous movement, and second—in having a board or feed gage so arranged that when the straw is placed in the hopper or straw box, in a vertical position, the gage will arrest the falling of the straw, at such distance below the knives as will give the requisite length which the straw is to be cut, and retain it in that position until it is clasped by the knives and held by them in their approach toward each other, when the gage drops at one end, forming an inclined plane over which the cut straw passes to one side of the machine.

*Explanation of the drawings:*—The annexed drawing, Figure 1, is an isometrical view of the machine, A, B, being the frame, and Q showing the straw box or hopper, in dotted lines, resting in the small frame R, R. C', C², exhibit the knives attached to the blocks or small frames E, E, which move in the horizontal top timbers of the frame in grooves as seen at A, *h*. D, D, D, show the edges of the knives in the position of approaching each other toward the center. The knife C', having two indentures or triangular edges in the form of the letter W, and C² one indenture or triangular edge in the form of the letter V. The sides of the knives next to each other are straight and even, permitting the edges to come nearly in contact, to enable them to cut with ease. The knives are of sufficient width to extend their external points outside of the straw, so as to clasp the straw within their forked edges, thus making each knife the bearing against which the other cuts, thereby dispensing with the use of other machinery to hold and press the straw to insure its being cut with ease or to prevent it from being thrown to one side of the box or from its perpendicular position. The knives are made to move back and forth, in the operation of cutting, by turning the crank shaft H, at the fly wheel E, to which is attached the pitman K connected with the block or frame of one knife, and the pitman I, I, connected with the frame of the other knife by means of the arms *a* and *b* in roller M and pitman L, which communicates, simultaneously, to the two knives, the motion required. The feed gage is represented at F, as in the inclined position in which it remains while the straw is being cut, from which position it is raised as the knives recede, till it lies horizontal, to sustain the straw and regulate the length of feed, by the turning of the cam N, attached to the fly wheel shaft, and the motion communicated thereby to the lever O and cord P. As the cam revolves it depresses the upper end of the lever from the bottom of the opening or notch *d*, to the periphery of the cam, turning the lever upon its pivot *r*, and elevating its foot, drawing upon the cord P, which renders on the pulleys or hooks as seen at *c c*, at the same time elevating the feed gage to the horizontal position described, and the periphery of the cam being the segment of a circle having a common center with the shaft on which it is placed, retains the feed gage in the same position, until the end of the lever arrives at the notch *d*, when the feed gage, by its own weight, again drops, returning the lever to its position as seen in the drawing, and the straw as cut slides down on the feed gage and is discharged at the side of the machine.

Fig. 2 is a section exhibiting the knives C' and C², attached to their blocks or frames E, E, and showing the forms of the edges at D, D.

What I claim and wish to secure by Letters Patent is—

1. The use of two triangular edged knives combined in a straw cutting machine, operating substantially in the manner above described.

2. I also claim the manner of combining the feed board or gage with the straw cutter substantially as above described.

ISRAEL J. RICHARDSON.

Witnesses:
ALBRAY W. VON SCHMIDT,
PETER VON SCHMIDT.